(12) United States Patent
Azar et al.

(10) Patent No.: US 10,083,409 B2
(45) Date of Patent: Sep. 25, 2018

(54) WIRELESS CUSTOMER AND LABOR MANAGEMENT OPTIMIZATION IN RETAIL SETTINGS

(71) Applicant: BBY SOLUTIONS, INC., Richfield, MN (US)

(72) Inventors: Michele Azar, Edina, MN (US); Lisa Hake, Richfield, MN (US); Andrew Marble, Richfield, MN (US); Brent Shiely, Eden Prairie, MN (US); William Don Wortley, Minneapolis, MN (US); Michael Zorn, Farmington, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 302 days.

(21) Appl. No.: 14/180,527

(22) Filed: Feb. 14, 2014

(65) Prior Publication Data
US 2015/0235161 A1    Aug. 20, 2015

(51) Int. Cl.
*G06Q 10/06*    (2012.01)
*G06Q 30/02*    (2012.01)
(Continued)

(52) U.S. Cl.
CPC .  *G06Q 10/063114* (2013.01); *G06Q 30/0261* (2013.01); *G06Q 30/0269* (2013.01); *H04W 4/021* (2013.01); *H04W 4/043* (2013.01)

(58) Field of Classification Search
None
See application file for complete search history.

(56) References Cited

U.S. PATENT DOCUMENTS 5,631,949 A * 5/1997 Milton ................. H04M 3/533
                                                      379/142.06
6,091,956 A * 7/2000 Hollenberg ............ G06Q 30/02
                                                         455/456.5
(Continued)

FOREIGN PATENT DOCUMENTS

WO    WO-2013/043590 A1    3/2013
WO    WO-2013/155070 A1    10/2013

OTHER PUBLICATIONS

Personalized Graphic Advertisements by Stephen Spielberg from Minority Report Movie at Technovelgy, Jun. 26, 2006 https://web.archive.org/web/20060626023514/http://www.technovelgy.com/ct/content.asp?Bnum=1044.*

(Continued)

*Primary Examiner* — Octavian Rotaru
(74) *Attorney, Agent, or Firm* — Schwegman, Lundberg & Woessner, P.A.

(57) ABSTRACT

Techniques and system configurations for tracking customers and employees in a commercial environment such as a retail store are described herein. Customer devices that are operated by an associated customer may be tracked to determine customer shopping activities in a retail store, and to obtain promotions or affect targeted results based on the customer's activity and a profile associated with the customer. Employee devices that are operated by an associated employee also may be tracked to identify employee activities and manage the interactions that occur with customers in the retail environment. In-store activities and interactions accordingly may be enhanced as a result of advertising, marketing, and analytics derived from the tracked activities.

18 Claims, 8 Drawing Sheets

(51) Int. Cl.
*H04W 4/021* (2018.01)
*H04W 4/04* (2009.01)

(56) References Cited

U.S. PATENT DOCUMENTS

| | | | | | |
|---|---|---|---|---|---|
| 6,202,023 | B1* | 3/2001 | Hancock | | G01C 21/20 |
| | | | | | 701/516 |
| 6,332,127 | B1* | 12/2001 | Bandera | | G06Q 30/02 |
| | | | | | 705/14.55 |
| 6,587,835 | B1* | 7/2003 | Treyz | | G06Q 20/12 |
| | | | | | 705/14.64 |
| 7,264,157 | B2* | 9/2007 | Ishizuka | | G06Q 30/02 |
| | | | | | 235/375 |
| 7,421,278 | B2* | 9/2008 | Srinivasan | | H04W 4/02 |
| | | | | | 455/414.1 |
| 7,653,594 | B2* | 1/2010 | Davis | | G06Q 30/0254 |
| | | | | | 705/39 |
| 7,822,426 | B1* | 10/2010 | Wuersch | | G01C 21/20 |
| | | | | | 342/450 |
| 7,934,639 | B1* | 5/2011 | Chen | | G06Q 20/20 |
| | | | | | 235/375 |
| 7,962,361 | B2* | 6/2011 | Ramchandani | | G06Q 30/02 |
| | | | | | 705/14.23 |
| 8,010,134 | B2* | 8/2011 | Barnes | | G06Q 30/0259 |
| | | | | | 455/404.2 |
| 8,046,001 | B2* | 10/2011 | Shalmon | | G06Q 30/02 |
| | | | | | 455/456.3 |
| 8,165,600 | B2* | 4/2012 | Walter | | G06Q 10/087 |
| | | | | | 455/456.1 |
| 8,224,766 | B2* | 7/2012 | Skibiski | | G06Q 30/02 |
| | | | | | 706/55 |
| 8,489,596 | B1* | 7/2013 | Milton | | G06Q 30/02 |
| | | | | | 455/456.1 |
| 8,559,931 | B2* | 10/2013 | Moon | | H04W 4/001 |
| | | | | | 455/414.2 |
| 8,711,737 | B2* | 4/2014 | Kandekar | | G06Q 30/0251 |
| | | | | | 370/265 |
| 8,725,168 | B2* | 5/2014 | Garcia | | H04W 4/02 |
| | | | | | 455/456.1 |
| 8,768,876 | B2* | 7/2014 | Shim | | G06N 5/048 |
| | | | | | 706/52 |
| 8,983,488 | B2* | 3/2015 | Sweeney | | H04W 4/02 |
| | | | | | 455/404.2 |
| 2002/0055906 | A1* | 5/2002 | Katz | | G06Q 20/10 |
| | | | | | 705/39 |
| 2002/0095333 | A1* | 7/2002 | Jokinen | | G06Q 30/02 |
| | | | | | 705/14.26 |
| 2002/0111172 | A1* | 8/2002 | DeWolf | | G06Q 30/02 |
| | | | | | 455/456.3 |
| 2003/0004802 | A1* | 1/2003 | Callegari | | G06F 17/30241 |
| | | | | | 705/14.13 |
| 2003/0006911 | A1* | 1/2003 | Smith | | G06Q 30/02 |
| | | | | | 340/988 |
| 2003/0063072 | A1* | 4/2003 | Brandenberg | | G01S 5/02 |
| | | | | | 345/173 |
| 2003/0065805 | A1* | 4/2003 | Barnes, Jr. | | G06Q 10/02 |
| | | | | | 709/231 |
| 2003/0171990 | A1* | 9/2003 | Rao | | G06Q 30/0202 |
| | | | | | 705/14.46 |
| 2003/0220835 | A1* | 11/2003 | Barnes, Jr. | | G06Q 10/1053 |
| | | | | | 705/14.36 |
| 2004/0199425 | A1* | 10/2004 | Van Luchene | | G06Q 30/06 |
| | | | | | 705/15 |
| 2004/0224703 | A1* | 11/2004 | Takaki | | H04W 4/02 |
| | | | | | 455/457 |
| 2005/0177385 | A1* | 8/2005 | Hull | | G06Q 10/10 |
| | | | | | 705/319 |
| 2005/0177614 | A1* | 8/2005 | Bourne | | H04L 51/32 |
| | | | | | 709/200 |
| 2005/0216337 | A1* | 9/2005 | Roberts | | G06Q 30/02 |
| | | | | | 705/14.58 |
| 2006/0026067 | A1* | 2/2006 | Nicholas | | G06Q 30/00 |
| | | | | | 705/14.58 |
| 2006/0085177 | A1* | 4/2006 | Toyama | | G01C 21/26 |
| | | | | | 703/22 |
| 2006/0089878 | A1* | 4/2006 | Roberts | | G06Q 30/02 |
| | | | | | 705/14.1 |
| 2006/0108419 | A1* | 5/2006 | Som | | G06Q 30/0603 |
| | | | | | 235/383 |
| 2006/0149459 | A1* | 7/2006 | Matsuura | | G01C 21/3679 |
| | | | | | 701/540 |
| 2006/0217135 | A1* | 9/2006 | Moore | | G06Q 30/02 |
| | | | | | 455/466 |
| 2006/0270421 | A1* | 11/2006 | Phillips | | G08B 21/0236 |
| | | | | | 455/457 |
| 2007/0005419 | A1* | 1/2007 | Horvitz | | G06Q 30/0241 |
| | | | | | 701/533 |
| 2007/0030824 | A1* | 2/2007 | Ribaudo | | G01S 5/0018 |
| | | | | | 370/328 |
| 2007/0061074 | A1* | 3/2007 | Safoutin | | G01C 21/3682 |
| | | | | | 701/431 |
| 2007/0061245 | A1* | 3/2007 | Ramer | | G06F 17/30867 |
| | | | | | 705/37 |
| 2007/0061302 | A1* | 3/2007 | Ramer | | G06F 17/3087 |
| 2007/0088897 | A1* | 4/2007 | Wailes | | G01C 21/343 |
| | | | | | 711/3 |
| 2007/0115142 | A1* | 5/2007 | Nakashima | | G01C 21/3682 |
| | | | | | 340/995.1 |
| 2007/0162228 | A1* | 7/2007 | Mitchell | | G06F 17/3087 |
| | | | | | 701/469 |
| 2007/0162680 | A1* | 7/2007 | Mitchell | | G06F 17/30241 |
| | | | | | 711/1 |
| 2007/0185768 | A1* | 8/2007 | Vengroff | | G06Q 30/02 |
| | | | | | 705/14.64 |
| 2007/0264968 | A1* | 11/2007 | Frank | | G06Q 30/02 |
| | | | | | 455/404.2 |
| 2007/0281690 | A1* | 12/2007 | Altman | | H04W 4/185 |
| | | | | | 455/435.1 |
| 2008/0086264 | A1* | 4/2008 | Fisher | | G01C 21/30 |
| | | | | | 701/533 |
| 2008/0089262 | A1* | 4/2008 | Crolley | | G06Q 30/0261 |
| | | | | | 370/312 |
| 2008/0133342 | A1* | 6/2008 | Criou | | G06Q 30/02 |
| | | | | | 705/14.41 |
| 2008/0172173 | A1* | 7/2008 | Chang | | G01C 21/30 |
| | | | | | 701/408 |
| 2008/0172357 | A1* | 7/2008 | Rechis | | G06F 17/3087 |
| 2008/0176583 | A1* | 7/2008 | Brachet | | G01S 5/0236 |
| | | | | | 455/456.3 |
| 2008/0214157 | A1* | 9/2008 | Ramer | | G06F 17/30749 |
| | | | | | 455/414.1 |
| 2008/0248815 | A1* | 10/2008 | Busch | | H04W 4/02 |
| | | | | | 455/456.5 |
| 2008/0288165 | A1* | 11/2008 | Suomela | | G01C 21/3641 |
| | | | | | 701/533 |
| 2008/0306826 | A1* | 12/2008 | Kramer | | G06Q 30/02 |
| | | | | | 705/14.14 |
| 2009/0070230 | A1* | 3/2009 | Silverstein | | G06Q 20/04 |
| | | | | | 705/26.1 |
| 2009/0104920 | A1* | 4/2009 | Moon | | G06Q 30/02 |
| | | | | | 455/456.3 |
| 2009/0112467 | A1* | 4/2009 | Jiang | | G01C 21/20 |
| | | | | | 701/431 |
| 2009/0132163 | A1* | 5/2009 | Ashley, Jr. | | G01S 5/0045 |
| | | | | | 701/467 |
| 2009/0132366 | A1* | 5/2009 | Lam | | G06F 17/30699 |
| | | | | | 705/14.36 |
| 2009/0138427 | A1* | 5/2009 | Kalavade | | G06Q 10/0637 |
| 2009/0143077 | A1* | 6/2009 | Jamshidi | | G06Q 30/02 |
| | | | | | 455/456.1 |
| 2009/0149197 | A1* | 6/2009 | Morgan | | G01S 5/02 |
| | | | | | 455/456.1 |
| 2009/0204672 | A1* | 8/2009 | Jetha | | G06Q 30/02 |
| | | | | | 709/204 |
| 2009/0239667 | A1* | 9/2009 | Rowe | | G07F 17/32 |
| | | | | | 463/42 |
| 2009/0254971 | A1* | 10/2009 | Herz | | G06Q 10/10 |
| | | | | | 726/1 |

(56) References Cited

U.S. PATENT DOCUMENTS

| | | | |
|---|---|---|---|
| 2009/0259544 A1* | 10/2009 | Link, II | G06Q 30/02 705/14.1 |
| 2009/0319187 A1* | 12/2009 | Deeming | G06Q 30/02 701/300 |
| 2010/0004997 A1* | 1/2010 | Mehta | G06Q 30/02 705/14.66 |
| 2010/0057541 A1* | 3/2010 | Bonner | G06Q 30/0261 705/26.1 |
| 2010/0079336 A1* | 4/2010 | Skibiski | G06Q 30/02 342/357.31 |
| 2010/0088179 A1* | 4/2010 | Desai | G01C 21/3407 705/14.49 |
| 2010/0121705 A1* | 5/2010 | Ramer | G06Q 30/02 705/14.46 |
| 2010/0153216 A1* | 6/2010 | Liang | G06Q 30/0259 705/14.57 |
| 2010/0191762 A1* | 7/2010 | Siress | H04L 63/104 707/769 |
| 2010/0198626 A1* | 8/2010 | Cho | G06Q 10/02 705/5 |
| 2010/0205060 A1* | 8/2010 | Athsani | G01C 21/3484 705/14.58 |
| 2010/0285818 A1* | 11/2010 | Crawford | G06Q 10/0637 455/456.3 |
| 2010/0317371 A1* | 12/2010 | Westerinen | H04M 1/72566 455/456.6 |
| 2010/0324994 A1* | 12/2010 | Crawford | G06F 17/30867 705/14.58 |
| 2011/0010422 A1* | 1/2011 | Bezancon | G06Q 30/02 709/204 |
| 2011/0035284 A1* | 2/2011 | Moshfeghi | G06Q 30/02 705/14.58 |
| 2011/0093340 A1* | 4/2011 | Kramer | G06Q 30/02 705/14.58 |
| 2011/0106624 A1* | 5/2011 | Bonner | G06Q 30/0261 705/14.58 |
| 2011/0136506 A1* | 6/2011 | Stewart | G06Q 50/01 455/456.1 |
| 2011/0167125 A1* | 7/2011 | Achlioptas | G06F 17/30041 709/206 |
| 2011/0173055 A1* | 7/2011 | Ross | G06Q 30/02 705/14.13 |
| 2011/0173072 A1* | 7/2011 | Ross | G06Q 30/0259 705/14.57 |
| 2011/0184945 A1* | 7/2011 | Das | G01C 21/206 707/724 |
| 2011/0191140 A1* | 8/2011 | Newman | G06Q 30/02 705/7.31 |
| 2011/0238296 A1* | 9/2011 | Purks | G06Q 30/00 701/533 |
| 2011/0307167 A1* | 12/2011 | Taschereau | G06Q 30/0241 379/88.01 |
| 2011/0317579 A1* | 12/2011 | Jones | G01S 5/02 370/252 |
| 2012/0008526 A1* | 1/2012 | Borghei | H04W 4/021 370/254 |
| 2012/0030011 A1* | 2/2012 | Rey | G06Q 30/0242 705/14.43 |
| 2012/0047087 A1* | 2/2012 | Amidon | G06Q 30/0282 705/347 |
| 2012/0100869 A1* | 4/2012 | Liang | H04W 4/02 455/456.1 |
| 2012/0100872 A1* | 4/2012 | Alizadeh-Shabdiz | G01S 11/02 455/456.1 |
| 2012/0108260 A1* | 5/2012 | Alizadeh-Shabdiz | H04W 4/028 455/456.1 |
| 2012/0115475 A1* | 5/2012 | Miyake | G06Q 10/06 455/435.1 |
| 2012/0163206 A1* | 6/2012 | Leung | G01S 5/0009 370/252 |
| 2012/0214513 A1* | 8/2012 | Hashimoto | H04W 64/006 455/456.2 |
| 2012/0253936 A1* | 10/2012 | Swenson | G06Q 30/00 705/14.58 |
| 2012/0290383 A1* | 11/2012 | Busch | G06Q 30/02 705/14.36 |
| 2012/0310737 A1* | 12/2012 | Song | G06Q 30/0261 705/14.57 |
| 2013/0046613 A1* | 2/2013 | Farahat | G06Q 30/00 705/14.43 |
| 2013/0054335 A1* | 2/2013 | Kjelsbak | G06F 3/04883 705/14.26 |
| 2013/0268449 A1* | 10/2013 | Mateer | G06Q 10/00 705/317 |
| 2013/0275169 A1* | 10/2013 | Acres | G06Q 10/06 705/7.14 |
| 2014/0222680 A1* | 8/2014 | McCauley | G07G 3/003 705/44 |
| 2014/0365334 A1* | 12/2014 | Hurewitz | G06Q 30/0613 705/26.41 |
| 2015/0221094 A1* | 8/2015 | Marcheselli | G06K 9/00335 382/103 |

OTHER PUBLICATIONS

Minority Report Movie Jun. 19, 2002, Gap Store Scene, youtube webpages Feb. 28, 2015 https://www.youtube.com/watch?v=ITjsb22-EwQ.*

Gerard Joffre, Welcome back to The Gap, Minority Report, excerpts from Minority Report 2002 movie, youtube webpages, Sep. 10, 2009 https://www.youtube.com/watch?v=hIX_F1VKldo.*

Gerard Joffre, Personalized Ads, Minority Report, excerpts from Minority Report movie 2002, you tube webpages, Sep. 10, 2009 https://www.youtube.com/watch?v=7B96gtEP2To.*

It is not fair—he is better equipped for triangulation—CartoonStock—undated https://www.cartoonstock.com/cartoonview.asp?catref=twln980.*

Triangulation—Definition and More from the Free Merriam-Webster Dictionary, Jan. 22, 2014 https://web.archive.org/web/20140122065838/http://www.merriam-webster.com/dictionary/triangulation.*

"Aerohive and Euclid Retail Analytics", © 2013 Aerohive Networks, Inc., (2013), 1-9.

Cunche, M., "I know your MAC Address: Targeted tracking of individual using Wi-Fi", *International Symposium on Research in Grey-Hat Hacking—GreHack 2013*), Grenoble, France, (2013), 17 pgs.

Grenoble, R., "Euclid Analytics and Retailers: How Stores Like Nordstrom Track You Via Your Smartphone's Wi-Fi Signal", [online]. *The Huffington Post*. Retrieved from the Internet: <URL: http://www.huffingtonpost.com/2013/05/08/euclicl-analytics-nordstrom-retailers-tracking-smartphone_n_3237534.html?view=print&comm_ref=false>, (May 8, 2013), 1 pg.

* cited by examiner

WIRELESS CUSTOMER AND LABOR MANAGEMENT OPTIMIZATION IN RETAIL SETTINGS

TECHNICAL FIELD

Embodiments pertain to information and data processing occurring in real-world commerce settings. Some embodiments pertain to electronic devices and related electronically-implemented processes that enable tracking and processing of employee and consumer activities occurring in commerce settings, such as retail stores that facilitate the sale of goods and services.

BACKGROUND

Retailers of goods and services maintain real-world (physical) stores to market goods and services to consumers. The customer's activity within the physical store has become more and more important to the profitability of the store as consumers are exposed to more advanced advertising and marketing strategies from both real-world and electronic sources. Likewise, employee activity within the physical store has become more important to the profitability of the store as employees provide a human source of useful information that can encourage sales.

Various techniques exist for tracking the number of customers that enter a store, but such techniques fail to track or measure the interactions that these customers have with store personnel such as employees, management, and representatives. Likewise, existing techniques often fail to collect useful data on store personnel that may indicate where customer activity occurred within a store, whether a customer interaction was successful, how a customer interaction could be improved, or whether customer interactions are being missed entirely. Many of the key customer interactions taking place in a physical retail setting that could lead to a sale or further retail activity are not observed or monitored.

DETAILED DESCRIPTION

Figure 1:
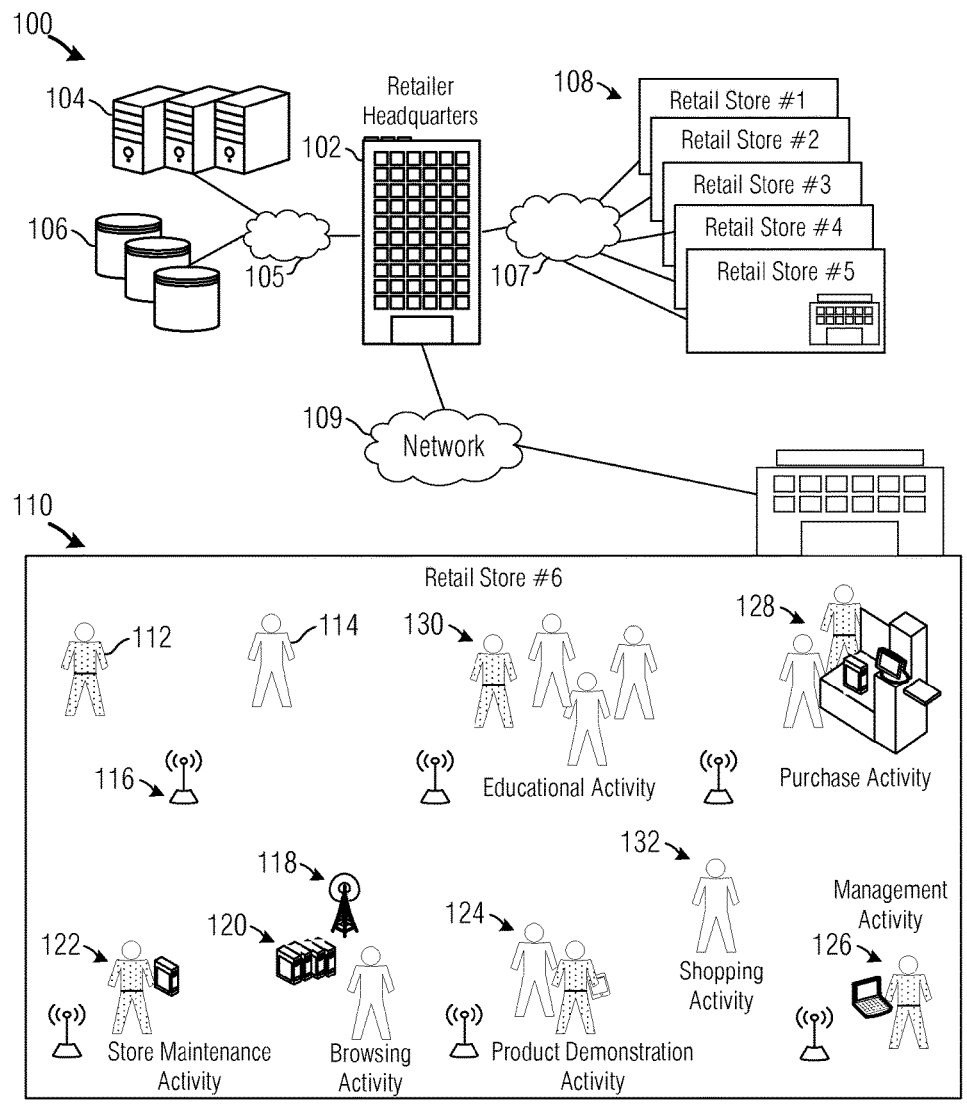
FIG. 1 illustrates interactions occurring among employees, customers, and other persons in a real-world retail environment according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some of the embodiments discussed herein are directed to techniques that enable tracking, identification, management, and enhancements of real-world commerce activities. In one example, the described techniques enable a retailer entity and the retailer's management departments to collect and process useful information from activity occurring in a store or other retail environment. This useful information may be collected for employees or customers, and may be used to indicate the presence or location information of commerce activities that occur in the retail environment. Some of the techniques described herein provide employees with mechanisms that can improve interaction with customers or provide useful information on commerce activities. Additionally, some of the techniques described herein provide customers with the ability to receive targeted offers or advertisements based on in-store behaviors or interactions with employees.

Various forms of customer and employee monitoring solutions are deployed in the marketplace to assist with issues such as leakage and theft, security, and staffing. Existing monitoring systems typically collect information that is captured via video cameras and closed circuit monitoring networks. The monitoring of such information, however, requires human intervention and ongoing decision making. For example, determining that 250 customers are present within a large retail store does not assist a retailer if many of these customers are not being helped or customer interactions are not properly occurring between employees and consumers. Likewise, identifying the locations of persons inside a store does not produce useful data if customers cannot be differentiated from customers.

The advancements that have occurred with mobile computing devices provide a new mechanism to collect and provide data from persons throughout the retail environment. Communication protocols such as Wi-Fi (Wireless Fidelity), Bluetooth, and Near Field Communications (NFC) are supported by a variety of consumer and retailer devices, and can be used to obtain tracking information for both customer and employee activity. Some protocols such as Bluetooth or Wi-Fi are already deployed in systems designed to determine the number of persons or a location of particular person in a store. However, data produced from such tracking systems is vague and general to customer movement, and is typically not correlated to the retail activity that is occurring in the store itself. Likewise, useful data from wireless device deployments has not been applied to track employees or employee activity in the retail setting.

The techniques described herein leverage tracking devices and techniques such as wireless network tracking to assist the shopping experience from the perspective of both retailers and customers. These techniques may provide an integration of information into store management, providing an enhanced customer experience in addition to useful data for management. In addition, the tracking information from employees and customers may be used to correlate employee sales and marketing activities to customer activity, allowing the selection and delivery of customized offers that are distributed in real-time within a retail environment.

As other examples, the digital tools described herein may be used to improve the customer experience by targeting assistance and real-time offers based on the customer's in-store behavior such as looking at a particular product or browsing a certain section of the store. The digital tools can also help retail managers identify employees' activity on a sales floor within a retail store, and identify employees which need assistance or coaching. The data collected in the retail environment from customers and employees can also be used to identify beneficial employee behaviors to emulate, such as where to station or locate employees to optimize certain interactions with customers. The following examples illustrate how these and other functions may be enabled through the smart tracking environment deployed in a retail setting.

FIG. 1 provides an illustration of interactions occurring among employees, customers, and other persons in a real-world retail environment according to one example. FIG. 1 in particular shows information collection activities occurring in a retail organization 100 and in a retail environment 110 such as a retail store. As shown the retail organization 100 may include a plurality of stores 108 and sales and service activities occurring in the particular retail environment 110. It will be understood that the techniques described herein may collect and deploy data on an enterprise-, region-, or multiple-store basis, or focus activities to individual stores.

As shown, the retail environment 110 is connected to a retail headquarters 102 via a private network 109, and the plurality of retail stores 108 are connected to the retailer headquarters 102 through at least one private network 107. Data is provided from the plurality of retailers 108 and the retail environment 110 via the private networks 107, 109 for processing by servers 104 and data warehouse 106 (connected to the retailer headquarters 102 via another private network 105, or in other examples, common portions of networks 107, 109).

In the retail environment, a plurality of employees (with each employee depicted similar to the employee 112) and a plurality of customers (with each customer depicted similar to the customer 114) may be involved in various types of commercial activities, such as shopping activities, promotional activities, and service activities. These commercial activities in the retail environment 110 may be tracked and monitored in connection with the data collected by the retailer headquarters 102. As examples, at one location, a customer may be browsing a store display 120; at another location, an employee may be engaging in a store maintenance activity 122; at another location, an employee may be engaging in a product demonstration activity 124; at another location, an employee may be engaging in a management activity 126; at another location, a customer may be engaging with an employee cashier in a purchase activity 128; at another location, an employee may be providing information to a plurality of customers in an educational activity 130; and at another location, a customer may be navigating to another section of the store in a general shopping activity 132.

The data from the various shopping activities in the retail environment 110 may be collected in connection with employee and customer location tracking. The data may be collected in connection with the use of access points (e.g., a Wi-Fi access point 116) that provide coordinated wireless signals to locate (e.g., triangulate) a customer or employee device present at the location of the particular activity. The data may also be collected in connection with beacons (e.g., product display beacon 118) and radio frequency tags which can be detected at particular locations in the retail environment (e.g., when a customer is in proximity to a store display when browsing the store display 120).

The application of the various tracking activities may be facilitated through a variety of wireless communication protocols. These may occur with a dedicated device that is provided to the customer or employee, or a more general computing device (such as a smartphone, computer, wearable device) that is repurposed for interaction with the tracking ecosystem. For example, the depicted customers (e.g., customer 114) and employees (e.g., employee 112) in the retail environment 110 may each have a device at or adjacent to his or her respective location, that directly or indirectly provides the location of the device and the user relative to an access point, beacon, radio frequency identifier, or the like. An example tracking implementation using Wi-Fi and Bluetooth is further discussed below.

Wi-Fi. Wi-Fi refers to the standard operation of a protocol from the IEEE 802.11 family of wireless network protocol standards, implemented within standards such as IEEE 802.11a/b/g/n/ac. Many Wi-Fi implementations utilize service discovery techniques to discover access points in range. For example, the wireless device may periodically probe nearby wireless networks with probe request frames. From these probe request frames, the device's identifying MAC address is broadcast to listening access points and other devices in range. In addition, a device's MAC address may be broadcast to listening access points even if connected to another access point, because frame headers that accompany encrypted or unencrypted data payloads can identify the device's MAC address. In other scenarios, device identifiers may be determined in connection with triangulation of messages that are transmitted from a client device during Wi-Fi access point scanning procedures, DHCP connection establishment, and the extraction of data headers being exchanged with other Wi-Fi access points and networks.

Device-identifying data may be collected by routers and networking equipment regardless of whether the client device has requested to directly join or search for the Wi-Fi network. Such identifying data may be collected by a tracking system and triangulated to identify the physical location of the client based on the timestamp delays and offsets collected by multiple routers, and time of flight calculations based on the collected data. Other techniques such as signal strength, directional antennas, and response times may also be used in connection with Wi-Fi triangulation techniques. In addition, identifying data obtained from other messages used in established Wi-Fi connections and broadcasts may be utilized for tracking purposes.

Bluetooth. The term "Bluetooth" as used herein refers to a short-range digital communication protocol, which may provide a short-haul wireless protocol frequency-hopping spread-spectrum (FHSS) communication technique that operates in the 2.4 GHz spectrum. The Bluetooth protocol may operate according to a standard established by the Bluetooth Special Interest Group (SIG). A standard Bluetooth exchange permits devices within 30 feet of a transponder to receive and/or send data. However, a requesting device typically must opt-in to receive services from the transponder—a process known as "pairing".

One specific implementation of Bluetooth for proximity detection involves the use of beacons known as "iBeacons".

iBeacons operate using the Bluetooth Low Energy protocol (e.g., as defined in the Bluetooth 4.0 specification), through the use of a low-power wireless sensor beacon used to communicate information to a nearby wireless device. A wireless device may detect such beacons in some configurations for up to a 200 foot range. Wireless devices may be configured to set up and establish a connection with particular beacons without needing to perform a full Bluetooth pairing process.

Proximity detection in a retail environment may utilize Bluetooth for tracking portable devices such as mobile smartphones supporting Bluetooth communications. For example, a software application may opt in to communicate with a particular set of Bluetooth beacons in a retail environment. The communications with these Bluetooth beacons may be used to determine proximity to a particular location. In further examples, triangulation may be performed with the use of additional antennas and beacon sources.

Near Field Communication (NFC) and Radio Frequency Identification (RFID). NFC refers to protocols and data exchange standards involving the use of RFID communication chips. NFC may be used for two-way communication between endpoints to exchange data. In contrast, other uses of RFID chips may be one-way communications (e.g., to obtain an identifier from a RFID tag mounted at a particular location that must be processed further).

Proximity detection in a retail store may be performed using a combination of NFC exchanges associated with a communication device in proximity to a particular identifiable location. Proximity detection may also be performed through detection of RFID tags associated with a particular identifiable location in the retail environment. NFC and RFID technologies may also be used to provide a more precise mechanism of location once a device's location has been triangulated to a particular area or subset of a store with Wi-Fi or Bluetooth wireless communications.

Figure 2:
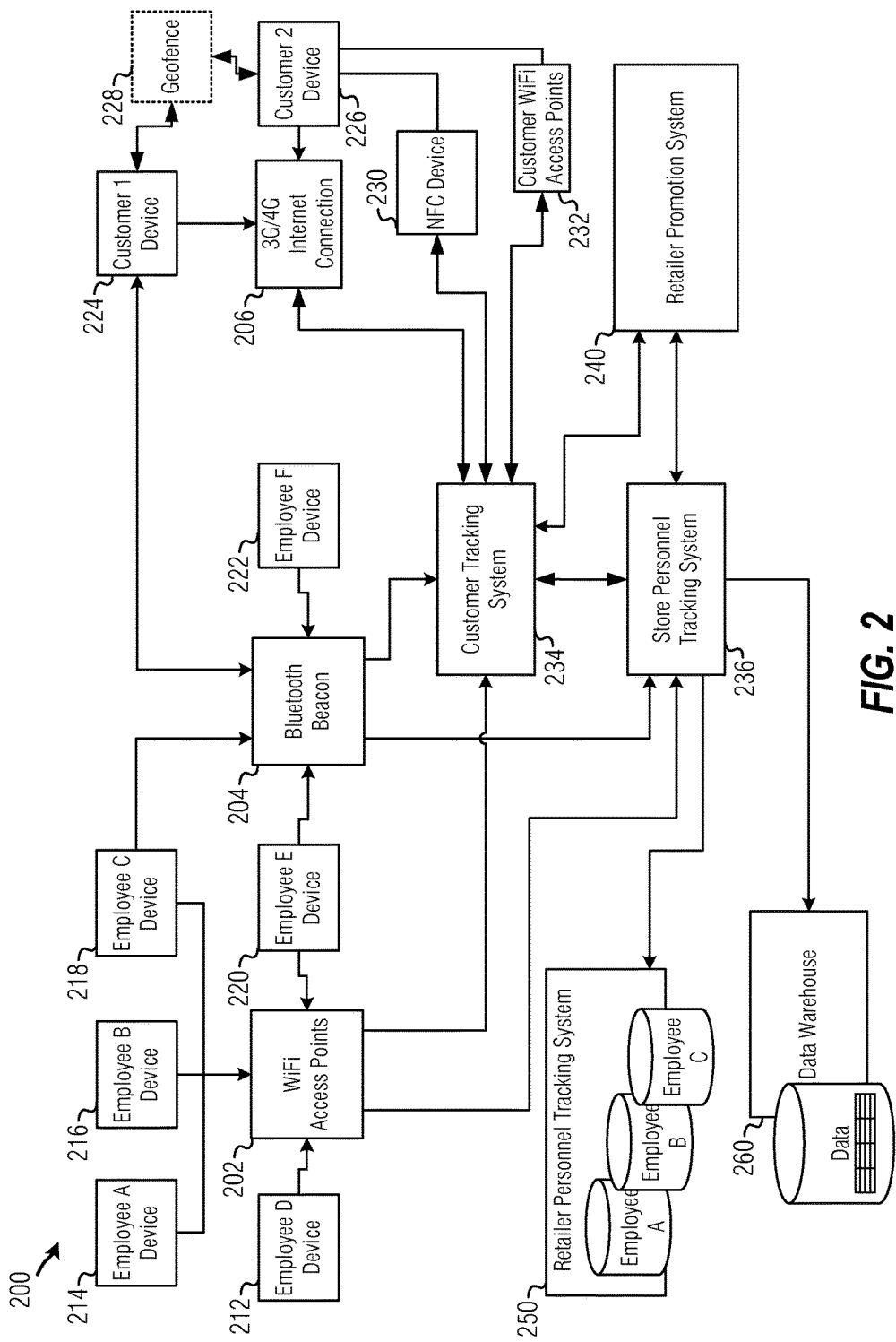
FIG. 2 illustrates communication activities occurring among systems and devices based on employee and customer activity in a retail environment according to an example described herein.

FIG. 2 provides an enhanced illustration of communication activities 200 occurring among systems and devices based on employee and customer activity in a retail environment (e.g., retail environment 110) according to a further example. For the communication activities 200, various wireless networks interact with employee and customer devices, and ultimately lead to the collection of data at a customer tracking system 234 and a store personnel tracking system 236. Again, these devices may involve smartphones, dedicated devices, wearable devices, or other electronic devices or mediums that can be used to uniquely identify a particular person and his or her role (as employee or customer).

As shown, a plurality of employee devices operated by respective employees (employee A device 214, employee B device 216, employee C device 218, employee D device 212, employee E device 220) are configured to connect with Wi-Fi access points 202 located throughout the store. The Wi-Fi access points 202 are able to communicate with the respective employee devices to triangulate locations of the devices. The functionality for determining the locations of the client device may be performed by the respective tracking system (e.g., the customer tracking system 234 or the store personnel tracking system 236) or on the client device itself (e.g., using software processing on the client device).

The communication activities 200 may also include interactions with other networks such as the interaction of a Bluetooth beacon 204 with employee devices (e.g., employee C device 218, employee E device 220, employee F device 222) and customer devices (e.g., customer 1 device 224). The Bluetooth beacon 204 may be used to determine a location of the employee or customer device within the retail environment relative to some fixed location, grid, or map of the retail environment. Thus, the Bluetooth beacon 204 may be used to obtain proximity information to a device relative to some coordinates (rather than triangulation-determined coordinates) for use in tracking devices and associated persons with the customer tracking system 234 and the store personnel tracking system 236.

The communication activities 200 are further depicted as interacting with the customer devices (e.g., customer 1 device 224, customer 2 device 226). For example, the customer devices may be operating as a specialized smartphone with a software application that communicates with the customer tracking system 234 via a 3G/4G internet connection 206. The customer devices may utilize a geofence 228 to determine proximity and entry to the retail environment, or more specific locations within the retail environment. As previously referenced, the customer devices (e.g., customer 1 device 224) may also be tracked (or provide tracking information) in connection with a Bluetooth beacon 204 located in the store; customer devices (e.g., customer 2 device 226) may also be tracked in connection with interaction with a NFC device 230 (e.g., NFC reader) or one or more Customer Wi-Fi Access Points 232. In other examples, the customer device may connect to the common access points as used by the employees (e.g., Wi-Fi Access Points 202). The location of the device may also be determined through combinations of wireless standards.

Trackable information that is communicated via a local area network or wide area network connection to the customer tracking system 234 and the store personnel tracking system 236 may be collected and used to determine the location of the particular customer or employee device in the retail environment. This location information may also trigger actions with a retailer promotion system 240. For example, certain promotions may be triggered to events and locations within the store such as visiting an interactive kiosk, selecting a product from a display shelf, interacting with a certain employee, and the like. Further examples of such functionality are described below.

The information that is communicated via a local area network or wide area network connection to the customer tracking system 234 and the store personnel tracking system 236 also may be stored and tracked for further processing. For example, the store personnel tracking system 236 may interact with a retailer personnel tracking system 250 to collect and aggregate information on individual employees and individual employee/customer encounters. The information may also be stored in a data warehouse 260 in a raw or processed format, and used to derive various analytics and reports on the activities occurring in the retail environment.

In some configurations, the customer tracking system 234 may operate as an opt-in system, where information on particular devices such as MAC addresses of wireless devices are tracked only upon some permission being provided by the associated user or the user device. The software application running on the customer device (and communicating via the internet to the customer tracking system 234) may be used to correlate a particular device MAC address or other identifier of the device with a particular user profile. In other settings, the customer tracking system 234 may operate to operate as an opt-out system, collecting MAC addresses of numerous Wi-Fi enabled devices as the devices pass through the retail environment, regardless of whether a specialized software application is installed.

Figure 3:
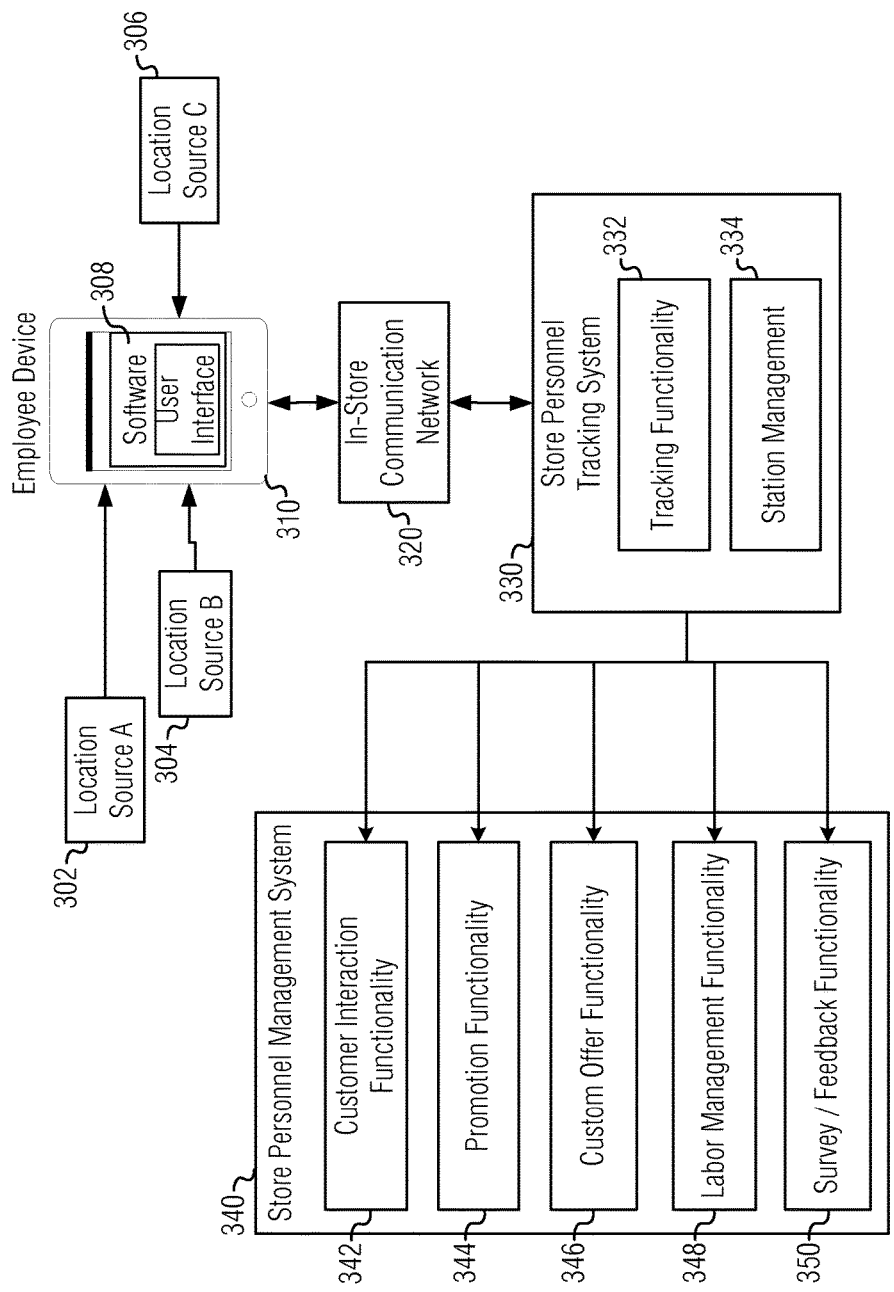
FIG. 3 illustrates interactions of a tracked employee device with a store personnel management system and store personnel tracking system according to an example described herein.

FIG. 3 provides an enhanced illustration of the interaction of a tracked employee device with a store personnel management system and a store personnel tracking system that may be deployed in the retail environments described herein. As shown, an employee device 310, such as a smartphone, tablet, portable computer, or other mobile computing device, operates software 308 including a user interface. The employee device 310 is configured to obtain location information from one or more location sources (e.g., Wi-Fi access points), such as location source A 302, location source B 304, and location source C 306, depicted in FIG. 3. (For example, the respective location sources may operate to collect information used to triangulate the location of the employee device 310). The employee device 310 is further configured to communicate with an in-store communication network 320 to transmit an identifier of the device, commands from the software application, and otherwise provide information and data used to interact with the store personnel tracking system 330.

The store personnel tracking system 330 is configured to provide tracking functionality 332 and station management 334, based on the identification of an employee in the store personnel tracking system 330 to the employee device 310 providing a unique identifier. The store personnel tracking system 330 can utilize the unique identifier to identify the employee and the employee's various roles in the retail store, for example. The store personnel tracking system 330 can further permit the retail environment's management to configure rules to define employees, interactions, zones/stations, and functionality in the store personnel management system 340 (such as offers, monitoring rules, survey eligibility and like). Accordingly, certain employee and retail-related events may be automatically and manually triggered as a result of the tracking functionality 332 and the station management 334.

The station management functionality 334 may include various types of employee station management. For example, the data collected by the store personnel tracking system 330 from known devices can be captured to identify the length of time a device was within a specific zone of the retail environment. These zones can also be called "Stations" that are correlated to a particular area of employee expertise (e.g., an electronics store with a "Mobile Computing" section). The store personnel tracking system 330 can identify when an employee was on duty, within a particular zone that they are assigned, or measure time the employee was outside a zone. The zones and stations could be specified by the store manager, and the manager would assign the zones and stations to a group or individual employees. This data would be used by the manager to measure the employee's adherence to the station they are assigned. In addition, various interactions with customers could be captured by employee, by station—enabling management to obtain metrics measuring interactions of employees with customers by station.

The store personnel management system 340 is configured to provide functionality for various retail activities based on detected employee and customer interactions in the retail environment, according to programmed rules and specifications. For example, the store personnel management system 340 may be configured to implement the following functionality in a retail environment:

Customer interaction functionality 342. The store personnel management system 340 can be used to identify customers whom employees have interacted with. The store personnel management system 340 can be used to measure interaction rates with customers. Customers can also be tracked to identify which particular customer has been interacted with. This tracking can reduce the "how may I help you?" multiple interactions which customers may find intrusive. In addition the store personnel management system 340 can identify customers that have not received a service interaction—and prompt store personnel to engage.

Promotion Functionality 344. The store personnel management system 340 can be used to deploy promotions to identified customers, sets of customers, zones in a retail environment, customers matching a certain profile, and based on real-time observed factors. These promotions may be in the form of coupons, discounts, gift certificates, rebates, and the like that can be electronically distributed from management or employees to the customer(s) according to rules or conditions.

Customer offer functionality 346. In addition to the promotion functionality 344, employees may broker and conduct various offers with specific customers. A customer, during an interaction with an employee, can receive an offer sent by the employee to the customer's wireless device. The store personnel management system 340 can measure offers sent by employee. The store personnel management system 340 can produce information, that when merged with point of sale information, can be used to identify conversion rates or redemption rates for the offer issued by an employee. Employees may be provided with a wallet of limited offers—e.g., five offers given per month. The employee may be provided with a range of offers to choose from to give to the customer. For example, a customer may transmit a gift certificate to the customer on the software application operating on the customer's mobile device.

Labor Management Functionality 348. The store personnel management system 340 can capture information on known employees, sales agents, or other personnel. The store personnel management system 340 can permit stakeholders to view metrics of overall labor (such as visitation rate, engagement rate, etc.). In addition, store management will be empowered to measure and optimize the in-store labor force to serve customers. Metrics such as Conversion Rate by Time of Day can be calculated when merging Point of Sale data with data from the store personnel management system 340. From such data, management can determine the optimal times of day to staff (and staff employees in certain departments and locations) based on when and how customers shop. The store personnel management system 340 will also permit management to understand interaction rates how they impact sales conversion and revenue.

The Labor Management Functionality 348 may be implemented in connection with data collected by: Measuring a number of devices—employees currently on the floor; measuring quantity and/or duration of interactions with customers; Measuring quantity and/or duration of interactions with fellow employees; Monitoring zone assignment—details of staying within the assigned zone or area of responsibility; and the like. This data may be used to establish a management console—a console where the information sent by these devices can be operated at a central location. For example, a dashboard and management system can be offered for store managers, district managers, etc. to leverage employment tracking and management; likewise, such management functionality can be used in scheduling and personnel deployment for workers.

Survey/Feedback Functionality 350. The employee can be served a survey after their interaction with the customer to gauge perceived customer satisfaction. The store personnel management system 340 can be used to identify the unique identifier of the customer or employee mobile device and send a survey to the device. The determination of eligibility (visit frequency, duration, survey history, etc.) can be configured within the store personnel management system 340. Surveys would be uniquely assignable back to the employee. Employees can use a survey to evaluate the interaction with the customer to identify if there is a likely sale, customer satisfaction, etc. Likewise, a customer may be served with a survey after their interaction with an employee to measure actual customer satisfaction, and data from an employee and customer can be correlated to each other.

Other similar customer-based functions may be deployed in connection with capabilities of the in-store communication network 320 (such as Wi-Fi and Bluetooth tracking) that communicate with customer devices. These customer-based functions may include:

Tracking of customer traffic patterns. Customer traffic data, when overlaid on the store floor plan and/or layout can give a visual cue to management of where customers choose to walk and where employees are or were stationed. This information may be provided as feedback in the store personnel management system 340.

In-Store Advertising Measurement. A zone can be specified within the retail environment that is sponsored by a vendor. The sponsorship value can be determined by the quantity of traffic moving through the zone—and the duration of time customers reside within the zone receiving the advertising experiences.

In-Store Behavior-Based Offers. When the customer enters the retail environment, it is assumed there will be multiple zones. The customer will be monitored by a tracking system. When the customer moves from one zone to the next, the system will be aware of this movement. The system can be configured to share a special offer to a customer upon entry, exit, or visit duration of a specific zone. For example, when the customer enters a Mobile Phone area of the electronics store, a relevant offer for mobile phone plans can be presented. Upon exiting the Mobile Phone area, a different offer can be presented. If the customer stays within the Mobile Phone area without an employee interaction for some period of time, such as 30 minutes, a unique offer could be presented to the employee on their mobile device.

Funnel Attribution. Vendors which maintain dedicated displays and sections of stores may be interested to learn if the demand generation activities conducted are driving traffic to their sections within the store. For example, a manufacturer may have interest to measure if advertising a certain new product model is driving additional in-store visits to the manufacturer's store area within the store locations.

Full Circle Optimization. Demand generation activities conducted by vendors drive traffic. The employee and customer tracking systems may be used to assist measurements of traffic and engagement within a specific location of the store. The tracking systems can further measure conversion rates for a customer visiting or viewing a demonstration. The demonstration experience can be specified as a zone or a specific place of interest for a customer. The tracking systems will collect the customer's unique identifier upon visit to the demonstration. The tracking systems, when joined with Point of Sale data, can identify the total quantity of visits to the demonstration to overall sales of the item for the day. This data will help calculate the conversion rate for the demonstration. This data will also be foundational to improving the demonstration to attract additional customers as well as improve conversion.

Figure 4:
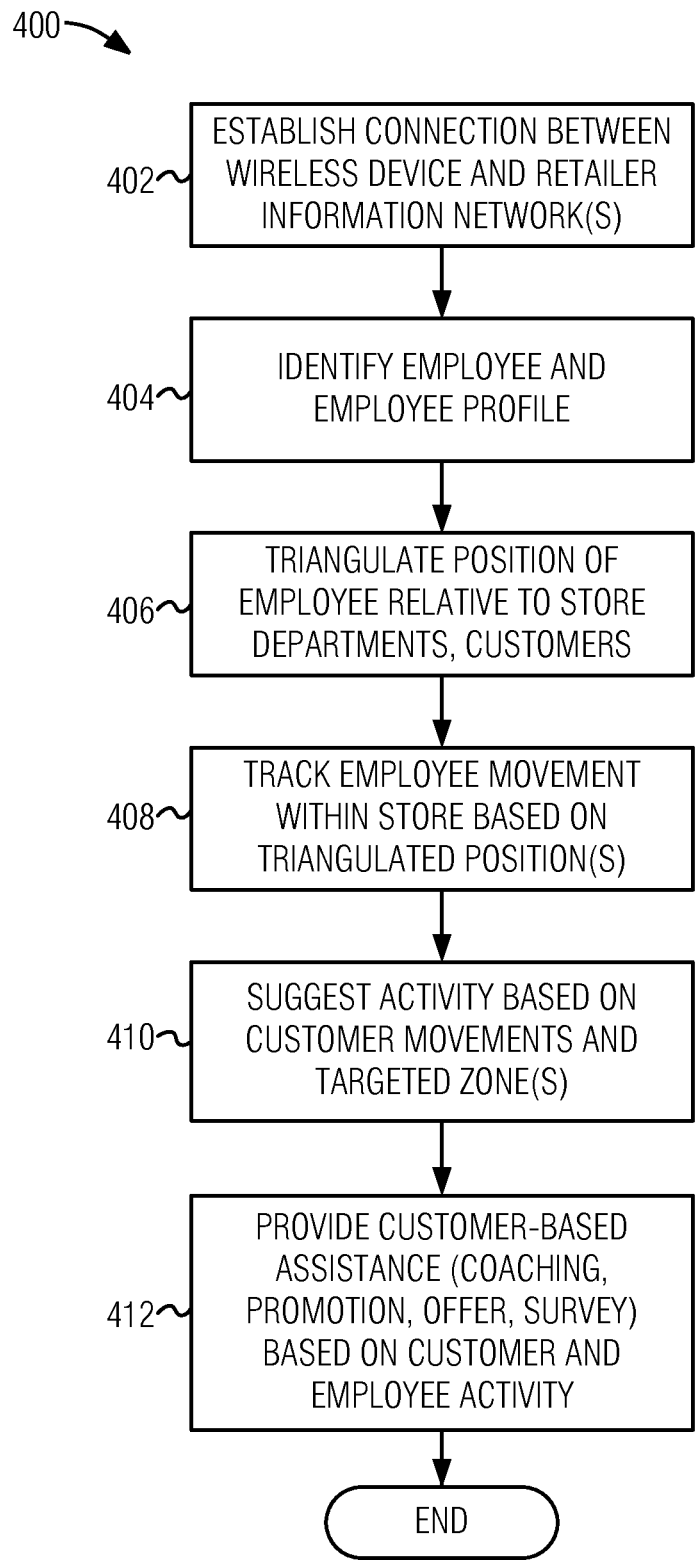
FIG. 4 illustrates an example method for tracking and interacting with an employee in a retail setting, according to an example described herein.

FIG. 4 illustrates an example method 400 for tracking and interacting with an employee in a retail setting, according to an example described herein. The method 400 may be implemented in hardware or software within one or more of the electronic processing systems of a retailer, service provider (including one or more outsourced service providers), or data processor; and such operations may be split across multiple entities. For example, this method may be embodied by a non-transitory machine-readable medium including instructions, or a device tracking and interaction component implemented in connection with the hardware processor and the memory. Accordingly, it will be understood that this method may be implemented with a computerized or electronic process that involves minimal or no human interaction.

As illustrated, the method 400 to track an employee includes the operations to establish an electronic connection (such as a wireless network connection using a wireless network communications transceiver) from the employee's electronic device to the retailer's information networks (operation 402). For example, an electronic device provided to the employee may establish communication with an in-store Wi-Fi network accessible in the retail environment, which is also configured to track locations and activities of the connected electronic device. Next, the particular employee and associated employee profile will be identified (operation 404) to tie the information on the retailer information network to a specific employee.

Using the established connection between the employee's device and the retailer information network, the position of the employee in the retail environment may be triangulated (operation 406) and determined relative to store departments and locations, customers, and other employees. Accordingly, employee movement and shopping activities that occur within the retail environment may be tracked based on the triangulated positions that are captured for the device, over a period of time (operation 408). This tracking technique may be assisted with the use of Bluetooth beacons, NFC communications, and the detection of RFID tags at zones and defined locations in the retail environment.

The information system can further operate to suggest activity to the employee from the detection of customer movements, targeted zones, and other strategies (operation 410). Based on the customer and employee activity (including movements of the customer and the employee across the store), customer-based assistance and shopping information such as coaching, custom offers, sales information, and the like can be suggested and provided (operation 412), and downloaded and received by the appropriate device.

In further examples, the tracking functionality applicable for an employee and an employee mobile device may also be applicable to a customer and a customer mobile device. For example, customer traffic patterns may be monitored and correlated to store management and employee activities. Customer traffic data, when overlaid on the store floor plan or layout, can give a visual cue to management of where customers choose to walk, how customers choose to commence shopping activities, and where employees are or were stationed.

As another example, interaction history between customers and employees may be utilized in a tracking system. The customers, when participating in the tracking system, can have interactions with specific employees monitored and logged. This interaction history can inform other employees in cases where a customer references a prior conversation with an employee. The interaction history, retained by the tracking system, also can be displayed to help clarify word-of-mouth information shared from a prior employee to the customer.

Other tracking features for customer interactions may include publishing information and interaction history to the store manager, indicating which employee is interacting with which customer. The interaction history can be shared directly with customers so the customer knows who to meet with upon return to the store. Upon logging in to a website or utilizing a mobile application, a customer can see his or her store visit history and interaction history with experts.

Other metrics that store managers may track include: "Touch Rate"—a metric that measures interaction rates for all customers. A store manager may aspire to have the interaction rate be near 100%; Average Interaction Duration—of each interaction a customer has with an employee, how long do they last? Of interactions an employee has with a fellow employee, how long do they last?; Surveyed satisfaction—of the individual employee, by store, by district, or in total for the store.

As a further variation, in-store behavior-based offers may be deployed to customers based on customer tracked activity. For example, when the customer enters the retail environment, it is assumed there will be multiple zones. The customer will be monitored by the tracking system on some ongoing basis. When the customer moves from one zone to the next, the tracking system will be aware of this movement. The tracking system can be configured to share a special offer to a customer upon entry, exit, or visit duration of a specific zone.

In-store advertising measurement may also be performed in connection with consumer activity. A zone can be specified within the retail environment that is sponsored by a manufacturer or vendor. The sponsorship value can be determined by the quantity of traffic moving through the zone—and the duration of time customers reside within the zone receiving the advertising experiences.

Figure 5:
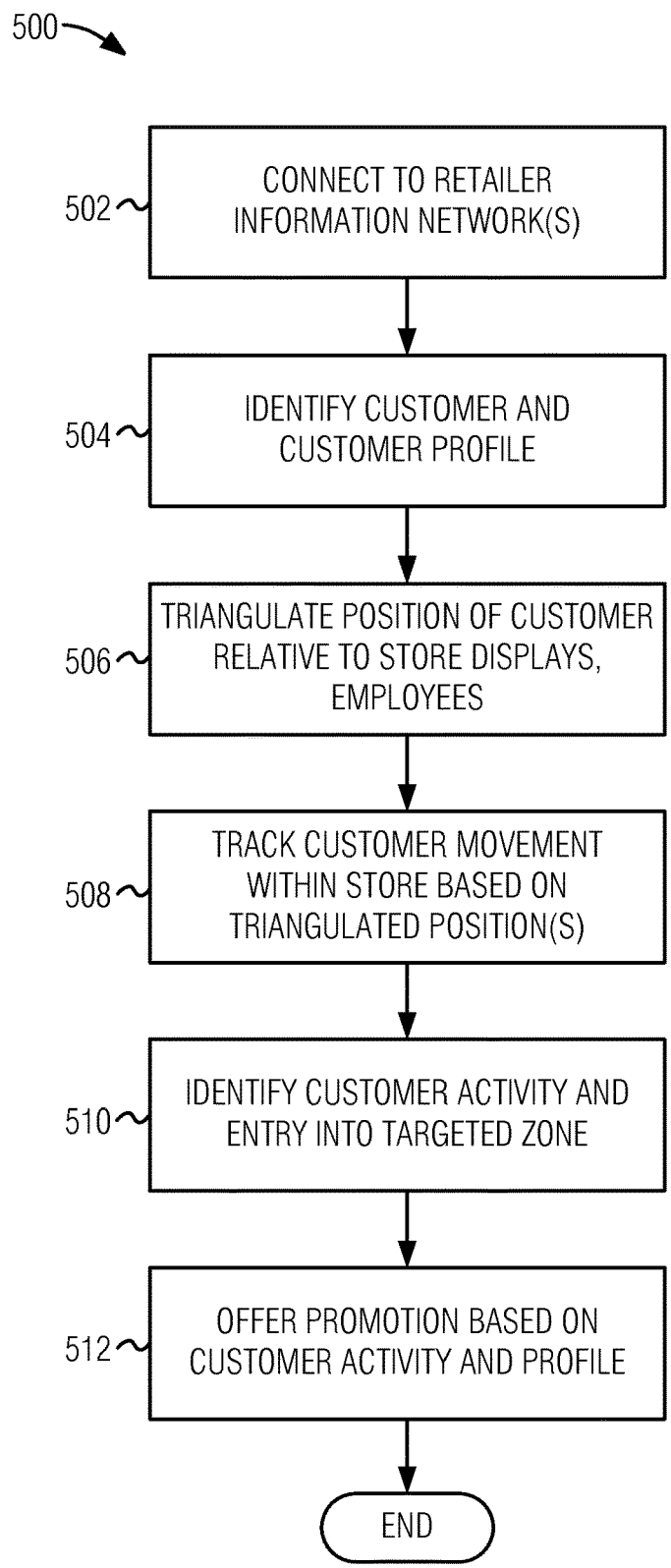
FIG. 5 illustrates an example method for tracking and interacting with a customer in a retail setting, according to an example described herein.

FIG. 5 illustrates an example method 500 for tracking and interacting with a customer in a retail setting according to a further example. Additionally, the method 500 may be implemented in hardware or software within one or more of the electronic processing systems of a retailer, service provider, or data processor (and as steps in substitute or addition to those of FIG. 4); and such operations may be split across multiple entities. This method also may be embodied by a non-transitory machine-readable medium including instructions, or a device tracking and interaction component implemented in connection with the hardware processor and the memory. Accordingly, it will be understood that this method may be implemented with a computerized or electronic process that involves minimal or no human interaction.

As illustrated, the method 500 to track a customer includes the operations to establish an electronic connection (such as a wireless network connection using a wireless network communications transceiver) from the customer's electronic device to the retailer's information networks (operation 502). For example, an electronic device operated by the customer (such as a smartphone) may transmit communications to an in-store Wi-Fi network accessible in the retail environment, which is configured to track locations and activities of the connected electronic device. Next, the particular customer and associated customer profile will be identified (operation 504), if available, to tie the device identification information on the retailer information network to a specific customer or customer instance.

Using information from the customer's device collected by the retailer information network, the position of the customer in the retail environment may be triangulated (operation 506) and determined relative to store departments and locations, employees, store displays, and the like. Accordingly, customer movement and shopping activities that occur within the retail environment may be tracked based on the triangulated positions that are captured for the device, over a period of time (operation 508). This tracking technique may be assisted with the use of Bluetooth beacons, NFC communications, and the detection of RFID tags at zones and defined locations in the retail environment.

The information system can further operate to identify certain customer activities and entry or departure from targeted zones or relevant areas in the retail environment (operation 510). Based on the customer activity (including movements of the customer and the employee across the store, and customer interactions) and customer profile, various types of promotions, prompts, customer-based assistance, and other shopping information can be suggested and provided in the retail environment (operation 512) and downloaded and received by the appropriate device.

Figure 6:
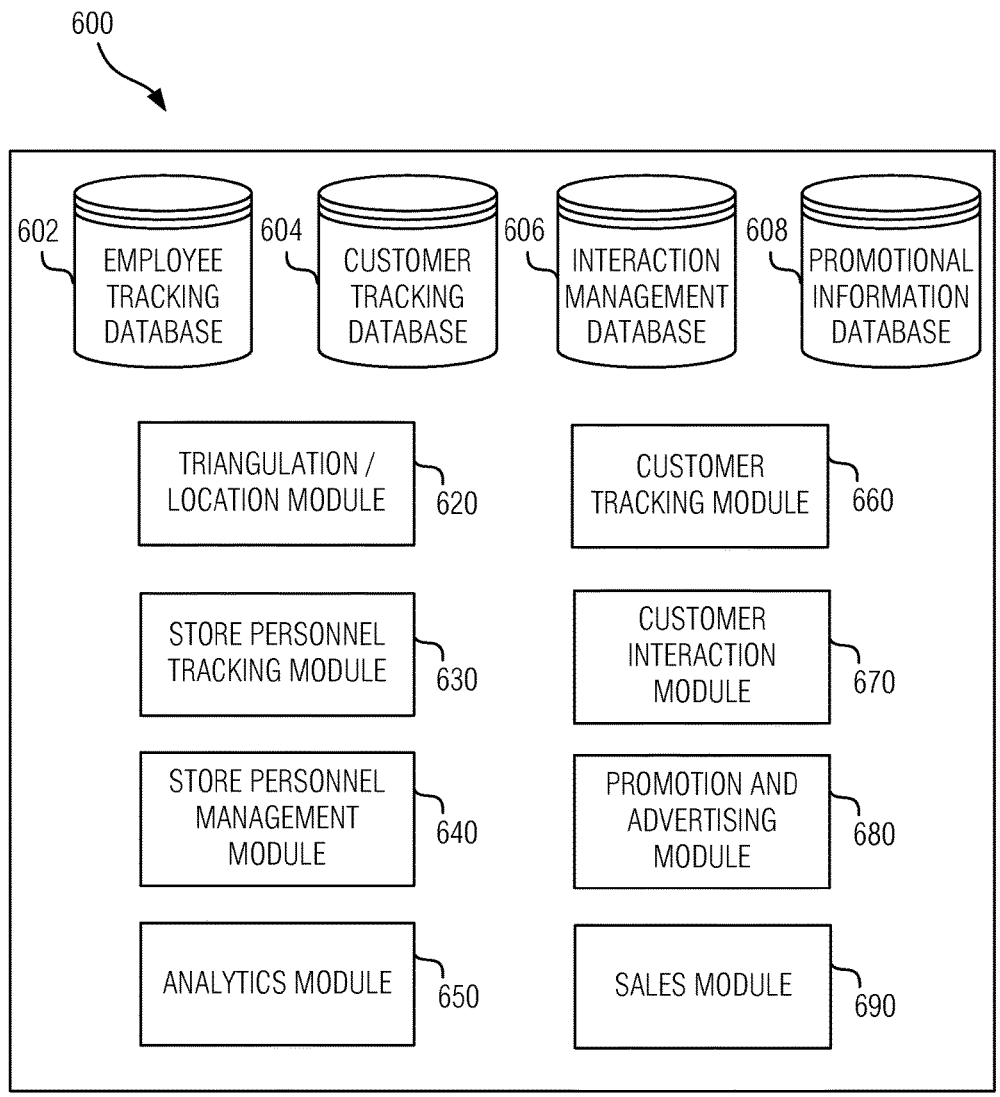
FIG. 6 illustrates a block diagram of computing system components adapted for processing and tracking information related to employee and customer tracking in a retail setting, according to an example described herein.

FIG. 6 illustrates a block diagram of a computing system 600 with components adapted for functionality of a tracking system that provides customer and employee tracking functionality. The computing system 600 may include a processor, memory, operating system, and user input interface to operate and provide interaction with the system 600. The computing system may be implemented within one or a plurality of computer systems, at one or multiple locations, and be implemented in connection with a remote or cloud-based processing deployment.

The computing system 600 is configured to implement a plurality of modules or components for device and person tracking according to the functionality described above. The computing system 500 is also configured to implement and maintain a plurality of data stores for storing data used in the tracking system to provide the functionality described above. A description of the following modules and data sources follows, but it will be understood that functionality and operation of the various databases and modules may be consolidated into fewer or expanded into additional databases or modules.

The computing system 600 is depicted as including: an employee tracking database 602 for storing tracking information for employees and other store personnel who operate in the retail environment; a customer tracking database 604 for storing tracking information for customers who conduct shopping activities in the retail environment; an interaction management database 606 for storing interactions among customers and employees; and a promotional information database 608 used for storing information used to generate promotional features in the retail environment. Additional data stores may also be used to track other functions involved in the tracking system such as a device database (not shown).

The computer system 600 is also depicted as including a series of modules or components providing functionality for implementing the features of a customer and employee tracking system. The modules or components include: a triangulation and location module 620 used for determining location of a device in a retail environment based on identifying information of the device; an store personnel tracking module 630 used for tracking locations of particular employees in the retail environment; a store personnel management module 640 used for managing employee roles and interactions as a result of tracking in the retail environment; an analytics module 650 used for generating analytics and reports on tracked customers and employees in the retail environment; a customer tracking module 660 used for tracking locations of identified customers in the retail environment; a customer interaction module 670 used for tracking customer interactions with products, locations, and employees in the retail environment; a promotion and advertising module 680 used for delivering targeted promotions and advertisements to the customer; a sales module 590 used to track and develop sales that occur in the retail environment as a result of some tracked activity.

Although the preceding examples were provided with reference to the use of Wi-Fi and Bluetooth technology, it will be understood that a variety of other location, tracking, and positioning systems may also be used to facilitate employee and customer tracking. For example, other types of "indoor GPS" and tracking technologies may be used to implement the triangulation and indoor positioning used to track particular devices and persons. Further, it will be understood that the techniques may be applied to a variety of mobile devices, and are not limited to smartphones with Wi-Fi and Bluetooth capabilities.

Figure 7:
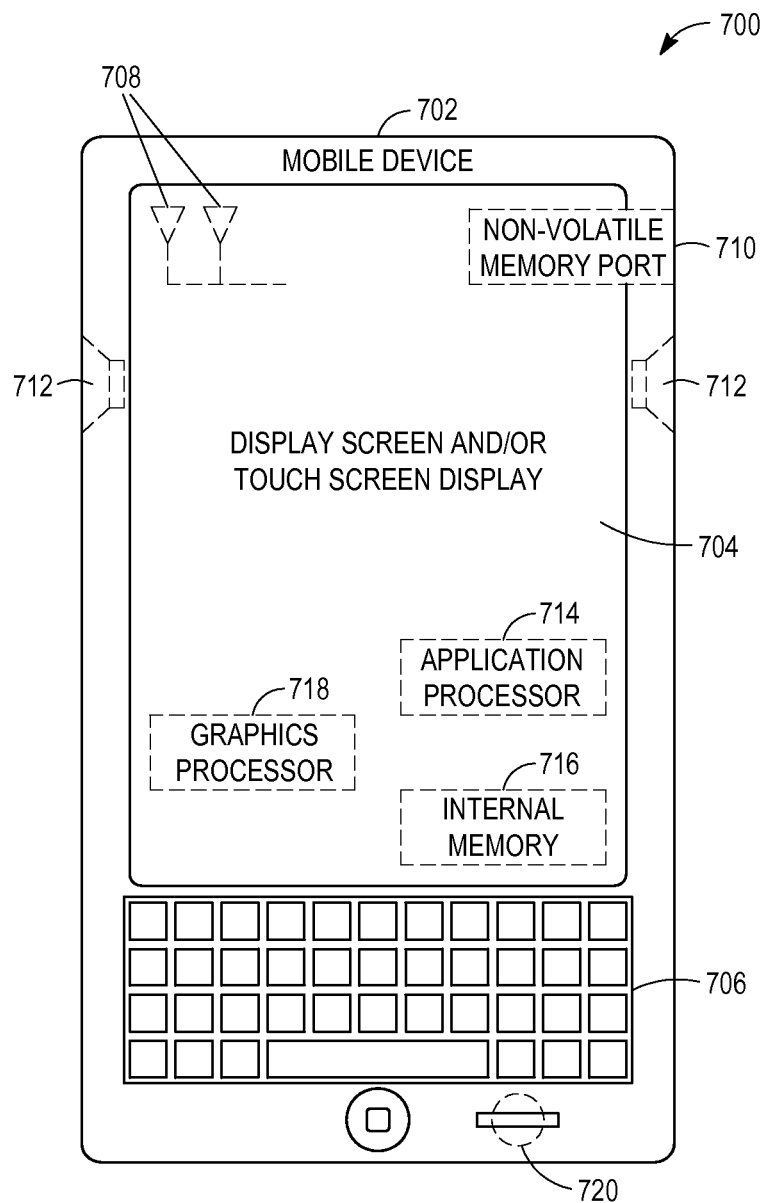
FIG. 7 illustrates an example mobile device on which the configurations and techniques described herein may be deployed.

FIG. 7 provides an example illustration of a mobile device 700 that may be used in connection with the tracking techniques described herein, such as a personal communication device, a tablet, a handset, a smartphone, or other type of mobile wireless-capable device. The mobile device 700 may include one or more antennas 708 within housing 702 that are configured to communicate with a base station (BS), an Long Term Evolution (LTE) evolved NodeB (eNodeB), or other type of wireless wide area network (WWAN) access point. The mobile device 700 may be configured to communicate using at least one wireless communication standard including 3GPP LTE, WiMAX, High Speed Packet Access (HSPA), Bluetooth, and Wi-Fi. The mobile device 700 may communicate using separate antennas for each wireless communication standard or shared antennas for multiple wireless communication standards. The mobile device 700 may communicate in a wireless local area network (WLAN), a wireless personal area network (WPAN), and/or a WWAN.

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 8:
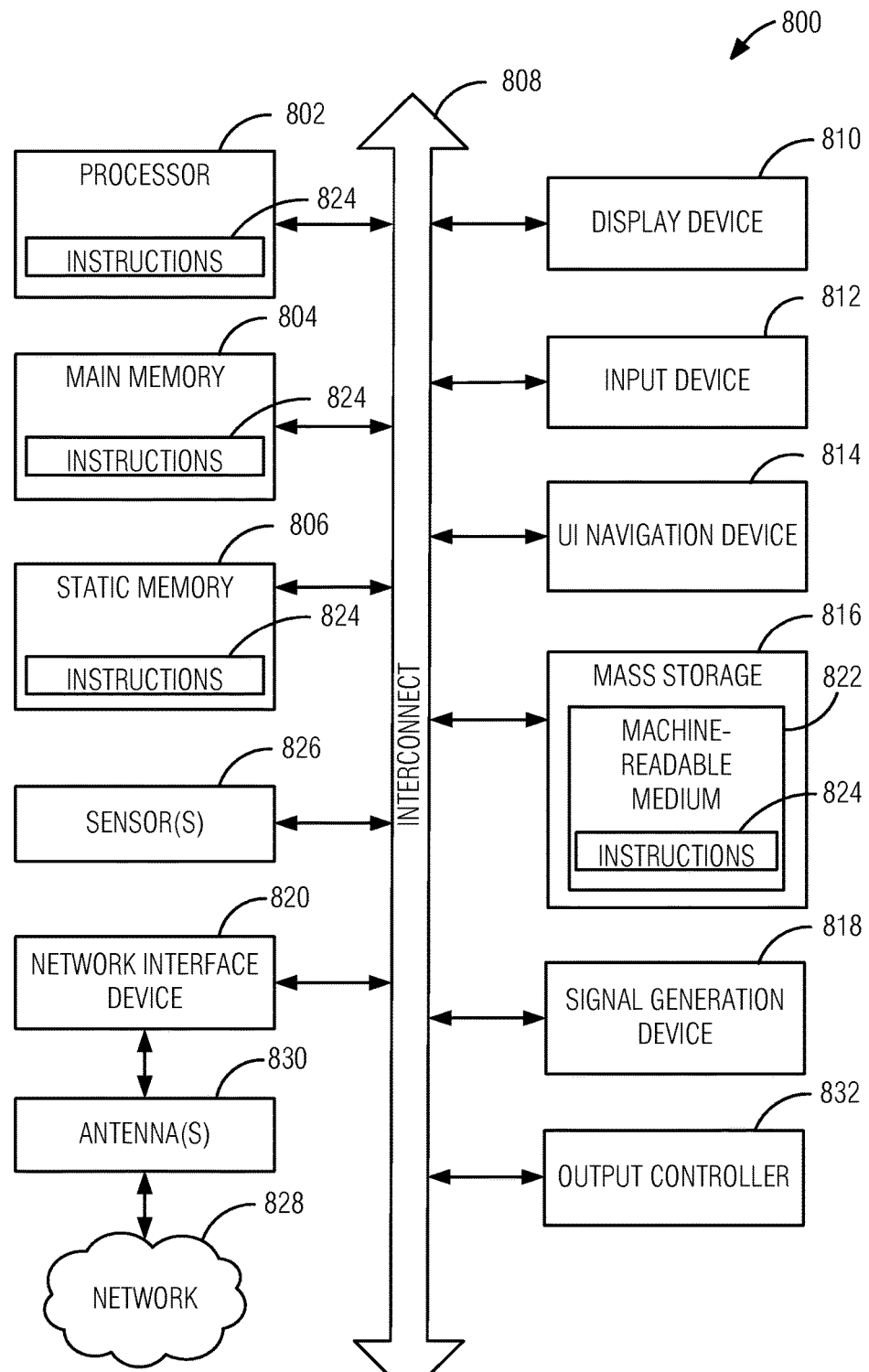
FIG. 8 is a block diagram illustrating operational components of a computing device upon which any one or more of the methodologies herein discussed may be run.

FIG. 8 illustrates a block diagram illustrating a machine in the example form of a computer system 800, within which a set or sequence of instructions may be executed to cause the machine to perform any one of the methodologies discussed herein, according to an example embodiment. Computer system machine 800 may be embodied by the electronic processing systems implemented by the servers 104 and data warehouse 106, the access points 116, 202, the beacons 204, the employee device 310, the tracking systems 234, 236, 330, 600; the subsystem(s) implementing the databases 602, 604, 606, 608; the subsystem(s) implementing the various modules or components 620, 630, 640, 650, 660, 670, 680, 690; or any other electronic processing or computing platform described or referred to herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touchscreen interface and touchscreen display. The computer system 800 may additionally include a storage device 816 (e.g., a drive unit), a signal generation device 818 (e.g., a speaker), an output controller 832, a network interface device 820 (which may include or operably communicate with one or more antennas 830, transceivers, or other wireless communications hardware), and one or more sensors 826, such as a global positioning system (GPS) sensor, compass, accelerometer, location sensor, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the configurations recited by the claims. Each of the examples in the claims may stand on its own, or may be combined in any permutation or combination with any one or more of the other examples provided below or throughout the present disclosure.

What is claimed is:

1. A method performed by electronic operations of an electronic tracking system accessible in a physical retail environment, comprising:

establishing a wireless network connection with a portable electronic device via a wireless communications network, the wireless communications network being accessible to the portable electronic device in the retail environment;

receiving, via the wireless communications network, an identifier of the portable electronic device;

identifying, from the identifier of the portable electronic device, an employee user associated with the portable electronic device;

obtaining, from a first set of wireless communications exchanged with the portable electronic device over the wireless communications network, location-identifying data for the first set of wireless communications;

calculating a position of the portable electronic device in the retail environment from analysis of the location-identifying data for the first set of wireless communications, wherein the position of the portable electronic device is determined relative to a plurality of defined locations in the retail environment, and wherein the plurality of defined locations correspond to a plurality of zones mapped for the retail environment;

obtaining, from a second set of wireless communications exchanged with the portable electronic device over the wireless communications network, location-identifying data for the second set of wireless communications;

tracking movement, of the portable electronic device in the retail environment by calculating updated positions of the portable electronic device from analysis of the location-identifying data for the second set of wireless communications, wherein the movement of the portable electronic device is determined relative to the plurality of defined locations in the retail environment; and delivering retail promotional information to the portable electronic device via a third set of wireless communications over the wireless communication network, wherein the retail promotional information is delivered to the portable electronic device based on the movement of the portable electronic device among the plurality of zones in the retail environment and based on a location of the portable electronic device in a particular zone of the plurality of zones;

wherein the retail promotional information is provided in a user interactive display presented to the employee user on the portable electronic device, and wherein the retail promotional information is selected for display to the employee user based on a location of a customer portable electronic device operated by a customer and movement of the customer portable electronic device among the plurality of zones in the retail environment.

2. The method of claim 1, wherein calculating the position of the portable electronic device includes triangulating a position of the portable electronic device within the retail environment from signal characteristics of the first set of wireless communications, wherein the first set of wireless communications are conducted according to a wireless fidelity (Wi-Fi) network standard from the IEEE 802.11 standard family, and wherein the identifier transmitted to the electronic tracking system via the wireless communications network is a MAC address.

3. The method of claim 1, wherein calculating the position of the portable electronic device is assisted by information obtained from one or both of a Bluetooth beacon or a Near Field Communication (NFC) device, the Bluetooth beacon operating according to a standard from a Bluetooth standards family, and the NFC device operating according to an exchange of data from a Radio Frequency Identifier (RFID) tag.

4. The method of claim 1, wherein the user interactive display presented on the portable electronic device includes prompts to assist the customer associated with the customer portable electronic device, the prompts to assist the customer including content based on activity of the customer in the retail environment, and wherein the activity of the customer is determined from tracking movement of the customer portable electronic device in the retail environment.

5. The method of claim 4, wherein the prompts to assist the customer include prompts for the employee user to offer a promotion to the customer based on shopping activity of the customer in the retail environment.

6. The method of claim 4, wherein the plurality of zones mapped for the retail environment respectively correspond to a plurality of product type department zones mapped for the retail environment.

7. The method of claim 1, wherein the portable electronic device is a smartphone, and wherein the retail promotional information selected for display to the employee user includes promotion prompts triggered from activity of the customer occurring among the plurality of zones in the retail environment.

8. The method of claim 7, wherein the retail promotional information delivered to the portable electronic device is further customized based on a customer profile associated with the customer, the customer profile maintained by a retail operator entity in the retail environment.

9. The method of claim 7, wherein the retail promotional information delivered to the portable electronic device is further customized to deliver promotions offered in respective zones of the plurality of zones in the retail environment, and wherein the movement and a time duration of the customer portable electronic device is tracked among the respective zones.

10. A non-transitory machine-readable storage medium including instructions for device tracking and interaction in a retail environment, the instructions which when executed by a computing device of an electronic tracking system cause the computing device to perform operations including:

establishing a wireless network connection with a portable electronic device via a wireless communications network, the wireless communications network being accessible to the portable electronic device in the retail environment;

receiving, via the wireless communications network, an identifier of the portable electronic device;

identifying, from the identifier of the portable electronic device, an employee user associated with the portable electronic device;

obtaining, from a first set of wireless communications exchanged with the portable electronic device over the wireless communications network, location-identifying data for the first set of wireless communications;

calculating a position of the portable electronic device in the retail environment from analysis of the location-identifying data for the first set of wireless communications, wherein the position of the portable electronic device is determined relative to a plurality of defined locations in the retail environment, and wherein the plurality of defined locations correspond to a plurality of zones mapped for the retail environment;

obtaining, from a second set of wireless communications exchanged with the portable electronic device over the wireless communications network, location-identifying data for the second set of wireless communications;

tracking movement of the portable electronic device in the retail environment by calculating updated positions of the portable electronic device from analysis of the location-identifying data for the second set of wireless communications, wherein the movement of the portable electronic device is determined relative to the plurality of defined locations in the retail environment; and delivering retail promotional information to the portable electronic device via a third set of wireless communications over the wireless communication network, wherein the retail promotional information is delivered to the portable electronic device based on the movement of the portable electronic device among the plurality of zones in the retail environment and based on a location of the portable electronic device in a particular zone of the plurality of zones;

wherein the retail promotional information is provided in a user interactive display presented to the employee user on the portable electronic device, and wherein the retail promotional information is selected for display to the employee user based on a location of a customer portable electronic device operated by a customer and movement of the customer portable electronic device among the plurality of zones in the retail environment.

11. The machine-readable medium of claim 10, wherein calculating the position of the portable electronic device includes triangulating a position of the portable electronic device within the retail environment, from signal characteristics of the first set of wireless communications, wherein the first set of wireless communications are conducted according to a wireless fidelity (Wi-Fi) network standard from the IEEE 802.11 standard family, and wherein the identifier transmitted to the electronic tracking system via the wireless communications network is a MAC address.

12. The machine-readable medium of claim 10, wherein calculating the position of the portable electronic device is assisted by information obtained from one or both of a Bluetooth beacon or a Near Field Communication (NFC) device, the Bluetooth beacon operating according to a standard from a Bluetooth standards family, and the NFC device operating according to an exchange of data from a Radio Frequency Identifier (REID) tag.

13. The machine-readable medium of claim 10, wherein the user interactive display presented on the portable electronic device includes prompts to assist the customer associated with the customer portable electronic device, the prompts to assist the customer including content based on activity of the customer in the retail environment, and wherein the activity of the customer is determined from tracking movement of the customer portable electronic device with the customer in the retail environment.

14. An electronic tracking system, comprising:

processing circuitry to perform electronic operations that:

establish a wireless network connection with a portable electronic device in a retail environment via a wireless communications network, the wireless communications network being accessible to the portable electronic device in the retail environment;

receive, via the wireless communications network, an identifier of the portable electronic device;

identify, from the identifier of the portable electronic device, an employee user associated with the portable electronic device;

obtaining, from a first set of wireless communications exchanged with the portable electronic device over the wireless communications network, location-identifying data for the first set of wireless communications;

calculate a position of the portable electronic device in the retail environment from analysis of the location-identifying data for the first set of wireless communications, wherein the position of the portable electronic device is determined relative to a plurality of defined locations in the retail environment, and wherein the plurality of defined locations correspond to a plurality of zones mapped for the retail environment;

obtaining, from a second set of wireless communications exchanged with the portable electronic device over the wireless communications network, location-identifying data for the second set of wireless communications;

track movement of the portable electronic device in the retail environment by calculating updated positions of the portable electronic device from analysis of the location-identifying data for the second set of wireless communications, wherein the movement of the portable electronic device is determined relative to the plurality of defined locations in the retail environment; and deliver retail promotional information to the portable electronic device via a third set of wireless communications over the wireless communication network, wherein the retail promotional information is delivered to the portable electronic device based on the movement of the portable electronic device among the plurality of zones in the retail environment and based on a location of the portable electronic device in a particular zone of the plurality of zones;

wherein the retail promotional information is provided in a user interactive display presented to the employee user on the portable electronic device, and wherein the retail promotional information is selected for display to the employee user based on a location of a customer portable electronic device operated by a customer and movement of the customer portable electronic device among the plurality of zones in the retail environment.

15. The system of claim 14, wherein the operations that calculate the position of the portable electronic device triangulate a position of the portable electronic device within the retail environment from signal characteristics of the first set of wireless communications, wherein the first set of wireless communications conducted according to a wireless fidelity (Wi-Fi) network standard from the IEEE 802.11 standard family, and wherein the identifier transmitted to the electronic tracking system via the wireless communications network is a MAC address.

16. The system of claim 14, wherein the operations that calculate the position of the portable electronic device are assisted by information obtained from one or both of a Bluetooth beacon or a Near Field Communication (NFC) device, the Bluetooth beacon operating according to a standard from a Bluetooth standards family, and the NFC device operating according to an exchange of data from a Radio Frequency Identifier (REID) tag.

17. The system of claim 14, wherein the user interactive display presented on the portable electronic device includes prompts to assist the customer associated with the customer portable electronic device, the prompts to assist the customer including content based on activity of the customer in the retail environment, and wherein the activity of the customer is determined from tracking movement of a second portable electronic device associated with the customer in the retail environment.

18. The method of claim 2, wherein the signal characteristics relate to:
  timestamp delays, response time, time of flight, signal strength, or direction, of the first set of wireless communications.

* * * * *